United States Patent [19]
Kwech

[11] Patent Number: 5,377,235
[45] Date of Patent: Dec. 27, 1994

[54] CONTROL ROD CANOPY SEAL POSITIONING AND WELDING SYSTEM

[75] Inventor: Horst Kwech, Lake Bluff, Ill.

[73] Assignee: Westinghouse Electric Corporation, Pittsburgh, Pa.

[21] Appl. No.: 133,424

[22] Filed: Oct. 8, 1993

Related U.S. Application Data

[62] Division of Ser. No. 821,365, Jan. 16, 1992, Pat. No. 5,268,941.

[51] Int. Cl.⁵ .............................................. G21C 19/00
[52] U.S. Cl. ..................................... 376/245; 376/260; 376/203; 376/206
[58] Field of Search ............... 376/203, 204, 206, 260, 376/463, 245

[56] References Cited

U.S. PATENT DOCUMENTS 5,031,816  7/1991  Kwech ................................. 376/203
5,268,941 12/1993  Kwech ................................. 376/260

Primary Examiner—Donald P. Walsh
Assistant Examiner—Frederick H. Voss

[57] ABSTRACT

A system is directed for remotely securing a canopy seal about a broken omega seal site between the control drive mechanism and the adapter tube of a nuclear reactor vessel so as to contain any radioactive leakage therebetween. The system includes a stalk measuring device for initially measuring the diameter of the adapter tube, a split canopy installation fixture which is adjusted according to the measurement detected by the stalk measuring device to position a two-piece canopy seal about the omega seal site, and a robotic weld arm for performing the upper and lower radial welds about the canopy seal as well as C-shaped vertical welds between the two-piece canopy seal.

42 Claims, 11 Drawing Sheets

CONTROL ROD CANOPY SEAL POSITIONING AND WELDING SYSTEM

This is a division of application Ser. No. 07/821,365 filed Jan. 16, 1992, now U.S. Pat. No. 5,268,941.

BACKGROUND OF THE INVENTION

This invention generally relates to the servicing of the omega seal site where a control rod drive mechanism attaches to the adapter tube of a nuclear reactor head stalk, and is specifically concerned with welding a canopy seal about the omega seal site to contain the radioactive steam released in the event of an omega seal failure.

The core of a modern nuclear reactor of the type used to generate electrical power generally includes an upper internals assembly disposed over a lower core barrel. The lower core barrel houses an array of fuel rod assemblies which generate heat as a result of a controlled fission reaction that occurs in the uranium oxide pellets present in the individual fuel rods. Water is constantly circulated from the lower core barrel through the upper internals and out through outlet nozzles provided in the walls of an upper core barrel in order to transfer the heat generated by the fuel rod assemblies to heat exchangers which ultimately convert this heat into usable, nonradioactive steam.

The upper internals assembly includes an upper core barrel arranged in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for both conducting the stream of hot, pressurized water exiting the fuel rod assemblies to the heat exchangers, as well as for conducting control rod assemblies. Separate guide tubes are provided between apertures in both the support and core barrel plates which are aligned with each other and with one of the fuel assemblies in the lower core barrel. The purpose of these guide tubes is to align and guide the relatively long and flexible rodlets of the control rod assemblies into a particular fuel assembly.

The rate of the fission reaction taking place within the fuel rod assemblies is regulated by means of the control rod assemblies. Each of these control rod assemblies is formed from an array of stainless steel tubes containing a neutron absorbing substance, such as silver, indium or cadmium. The stainless steel tubes (known as "rodlets" in the art) are suspended from a spider-like bracket. A reciprocable drive rod is connected to the spider-like bracket for either inserting or withdrawing the rodlets of the control rod assembly deeper into or farther out of each of the fuel rod assemblies in order to modulate the amount of heat generated thereby. These reciprocable drive rods are driven by control rod drive mechanisms which may be of the electromagnetic linear motion drive type devices or hydraulic drive type devices which move the control rods in incremental steps into and out of the reactor core. Each of the control rod drive mechanisms are attached to the reactor vessel head by way of adapter tubes, with the control rod drive mechanism being sealed to the adapter tube by way of an omega-type seal (so-called because of its resemblance in cross-section to the Greek letter omega).

Because hot, radioactive primary water is contained within the control rod drive mechanism, a leak may develop during the course of operation between the control rod drive mechanism and the adapter tube due to corrosion. Any such leak will promote further corrosion and lead to greater contamination around the area of the leak due to the radioactive steam released by the leak. Presently, due to the high radiation field and lack of working space, the omega seals must be repaired manually which requires a shut down of the reactor vessel and the removal of the control rod guide mechanism.

Applicant has observed that the servicing of broken omega seals requires extensive down time of the reactor vessel, with a large amount of labor costs as well as exposure of servicing personnel to potentially harmful radiation. Clearly, there is a pressing need for a system for both efficiently and effectively servicing broken omega seals that minimizes or eliminates reactor vessel down time, which typically costs the utility over $100,000 per day in lost revenues. Ideally, the system should reduce service personnel exposure to radiation contamination and contain the radioactive steam emitted from the broken omega seal.

SUMMARY OF THE INVENTION

Generally speaking, the present invention is a system for remotely securing a canopy seal about the omega seal site so as to contain any leakage that might occur between the control rod drive mechanism and the adapter tube. The system includes a stalk measuring device for initially measuring the diameter of the reactor stalk head or adapter tube, a split canopy installation fixture which is adjusted according to the measurement detected by the stalk measuring device to position a two-piece canopy seal about the omega seal site, and a robotic weld arm for performing both upper and lower radial welds about the canopy seal as well as C-shaped vertical welds between the two-piece canopy seal.

Because each adapter tube may vary slightly in diameter, and the canopy seal must mate with the adapter tube, the diameter of the adapter tube is initially determined by the stalk measuring tool. This tool is anchored to a carousel mounted above the control rod drive mechanism and lowered below the lower end of the control rod drive mechanism to the omega seal site. The stalk measuring tool includes a pair of caliper arms which are initially calibrated to a predetermined diameter. Once the measuring tool is lowered to the omega seal site, the previously calibrated arms are moved into contact with the adapter tube with the displacement of the arms being detected by sensors that direct this detection to a control center which provides a digital readout of the actual diameter of the particular adapter tube. Once the actual diameter has been detected, the stalk measuring tool is disengaged and removed.

The split canopy installation fixture is then adjusted to accommodate the canopy seal and to properly engage the adapter tube in order to hold the canopy seal in place for welding. The split canopy installation fixture cradling the canopy seal is then lowered to the omega seal site where hydraulic cylinders are remotely activated to clamp the installation fixture about the adapter tube and to camlock the fixture in place. Once the fixture is camlocked in place, additional hydraulic cylinders are remotely activated to properly position the canopy seal about the omega seal site. This fixture remains in place while the robotic weld arm descends to the omega seal site and temporarily tacks the canopy seal in place. Once the canopy seal has been sufficiently secured in place, the installation fixture is removed to allow the robotic weld arm total access to the canopy seal to complete the welding process.

The robotic weld arm is provided with five degrees of freedom to allow the robotic weld arm the flexibility and ability to work in a confined area. The arm is capable of performing the C-shaped vertical welds between the two canopy seal halves as well as the radial welds about the upper and lower periphery of the canopy seal. The robotic weld arm is also attached to the carousel positioned about an upper portion of the control rod drive mechanism which provides for the robotic weld arms orbital movement about the control rod drive mechanism and the adapter tube. An extension tube controls the vertical movement of the robotic weld arm while magnetic induction motors control elbow and wrist joints of the weld arm.

The weld process is viewed by two cameras located adjacent the torch cup of the robotic weld arm. One camera examines the leading edge of the weld while the other inspects the trailing edge of the weld. Additionally, in order to evacuate all of the oxygen encased by the canopy seal, an argon gas purge opening is inserted under the canopy seal after the installation fixture has been removed. The weld arm then performs its predetermined welding sequence, welding the argon purge opening last.

By providing the above mentioned canopy seal welding system, leakages experience at the omega seal site can be repaired from a position remote from the leakage site. This system will provide both efficient and effective servicing of ruptured omega seals while minimizing, and in most cases, eliminating reactor vessel down time, and significantly reducing the radiation exposure of service personnel.

DETAILED DESCRIPTION OF THE PREFERRED EMBODIMENT

Figure 1:
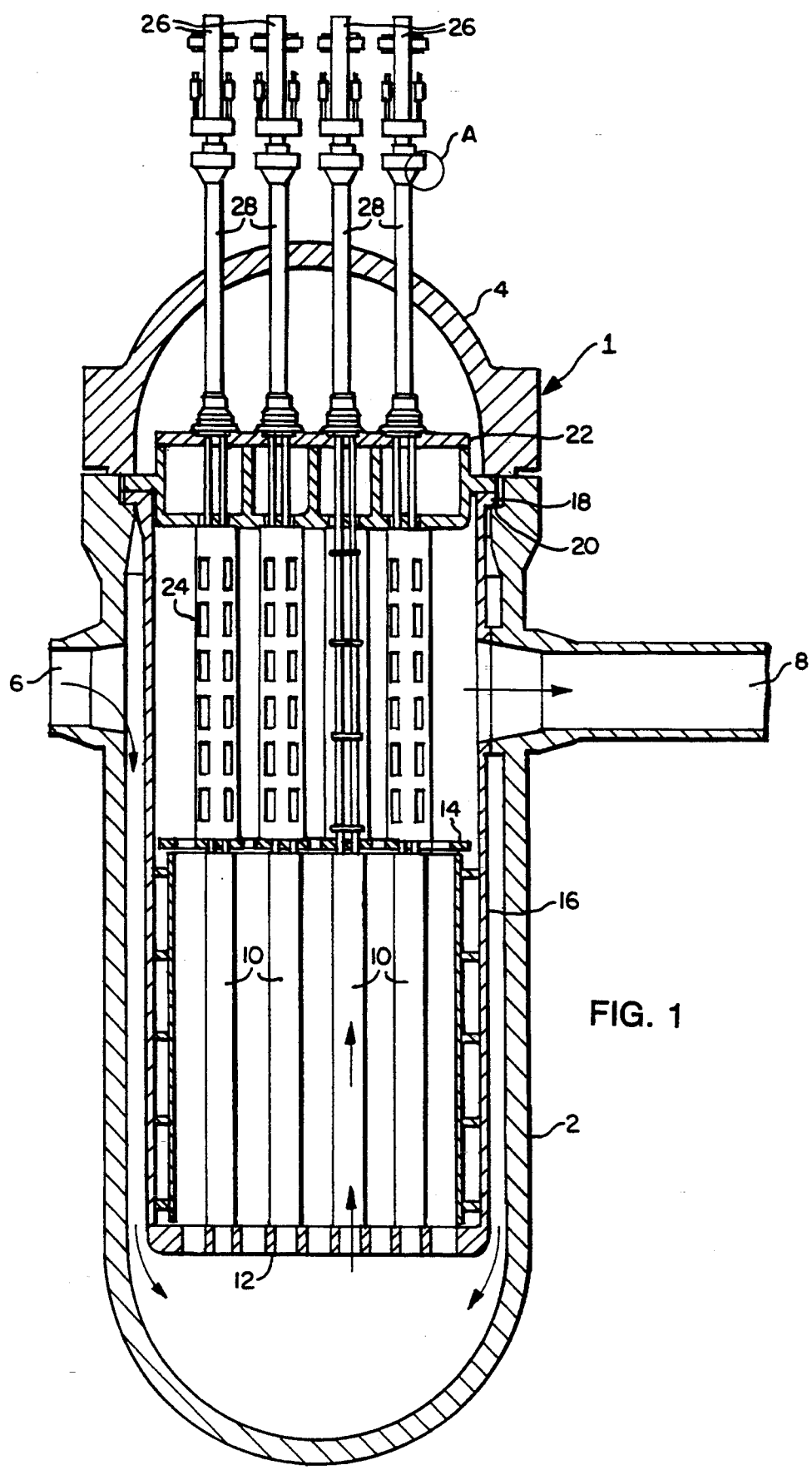
FIG. 1 is an elevational view of a nuclear reactor internals partially in section to which the present invention is adapted.

Referring to the drawings, and particularly to FIG. 1, the reactor 1 shown therein comprises a pressure vessel 2 having a removable closure head 4 attached to the pressure vessel 2 by a plurality of bolts (not shown). The pressure vessel 2 may be of a well known type suitable for containing a fluid coolant at a relatively high pressure. In the present case the coolant utilized is water; however, other suitable fluids may be utilized as a coolant if desired. The pressure vessel 2 has an inlet nozzle 6 and outlet nozzle 8. The coolant is circulated through the reactor vessel in a manner well known in the art. Fuel assemblies 10 are mounted within the pressure vessel 2 between a lower core plate 12 and an upper core plate 14 which constitutes the reactor core. The lower core plate 12 is attached by welding to a core barrel 16 having an upper flange 18 which rest on a ledge 20 of the pressure vessel 2. The upper core plate 14 is supported from a deep-beamed upper support plate 22 by means of a plurality of support tubes 24.

The reactor is provided with control rod drive mechanisms 26 that may be of any conventional type including electromagnetic linear motion drive type devices or hydraulic drive type devices which move the control rods in incremental steps into and out of the reactor core. As was noted previously, of the control rod drive mechanisms 26 are attached to the closure head 4 by way of adapter tubes 28 with the control rod drive mechanism 26 being sealed to a respective adapter tube 28 by way of an omega seal 30 as shown in FIG. 2.

Figure 2:
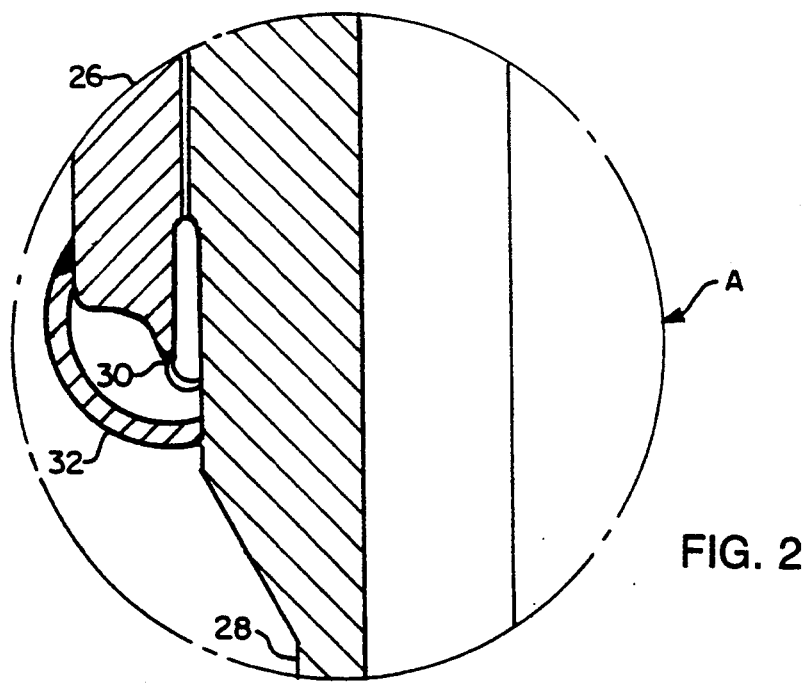
FIG. 2 is a cross-sectional exploded view of area A of FIG. 1 with a canopy seal in place.

As can be seen from FIG. 2 the omega seal 30 is the original seal between the adapter tube 28 and the control rod drive mechanism 26. Further, as can be noted from FIG. 2, a canopy seal 32 having a semi-circular cross-section is positioned and secured so as to enclose the entire periphery of the omega seal 30. It is the proper positioning and securing of a canopy seal 32 which constitutes the preferred embodiment of the present invention.

Figure 3:
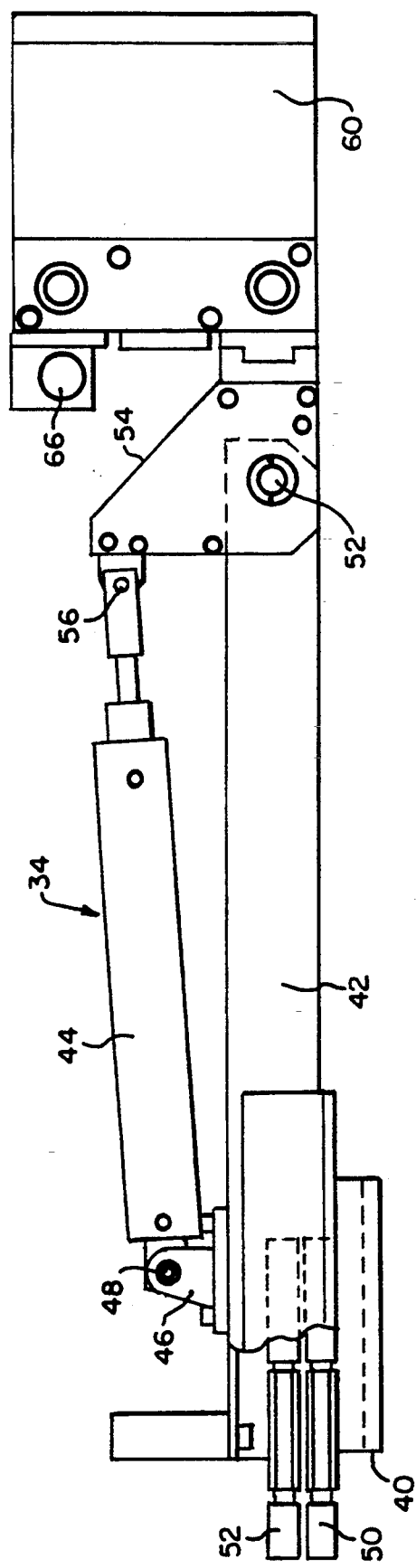
FIG. 3 is an elevational view of the stalk measuring device in accordance with a preferred embodiment of the present invention.
Figure 4:
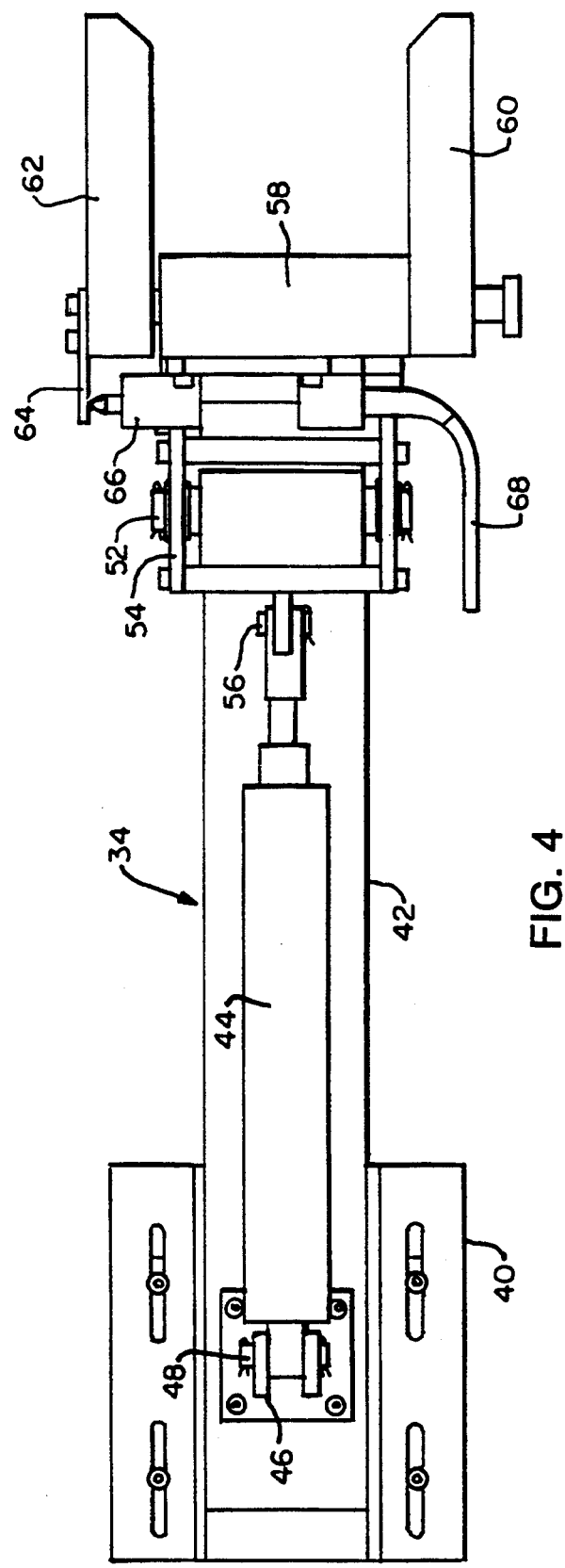
FIG. 4 is a side view of the stalk measuring device illustrated in FIG. 3.
Figure 7:
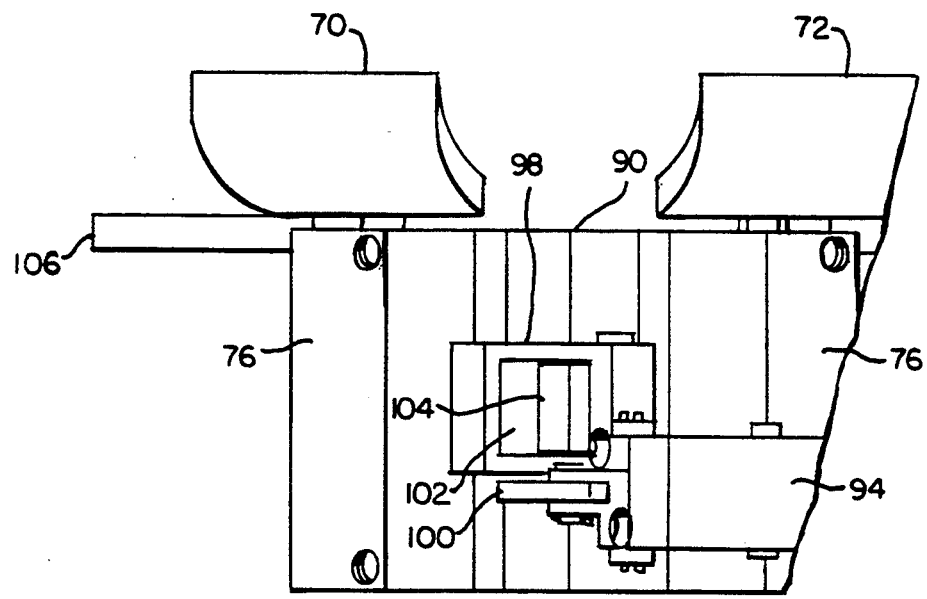
FIG. 7 is a top view of the split canopy installation fixture of FIG. 5.
Figure 8:
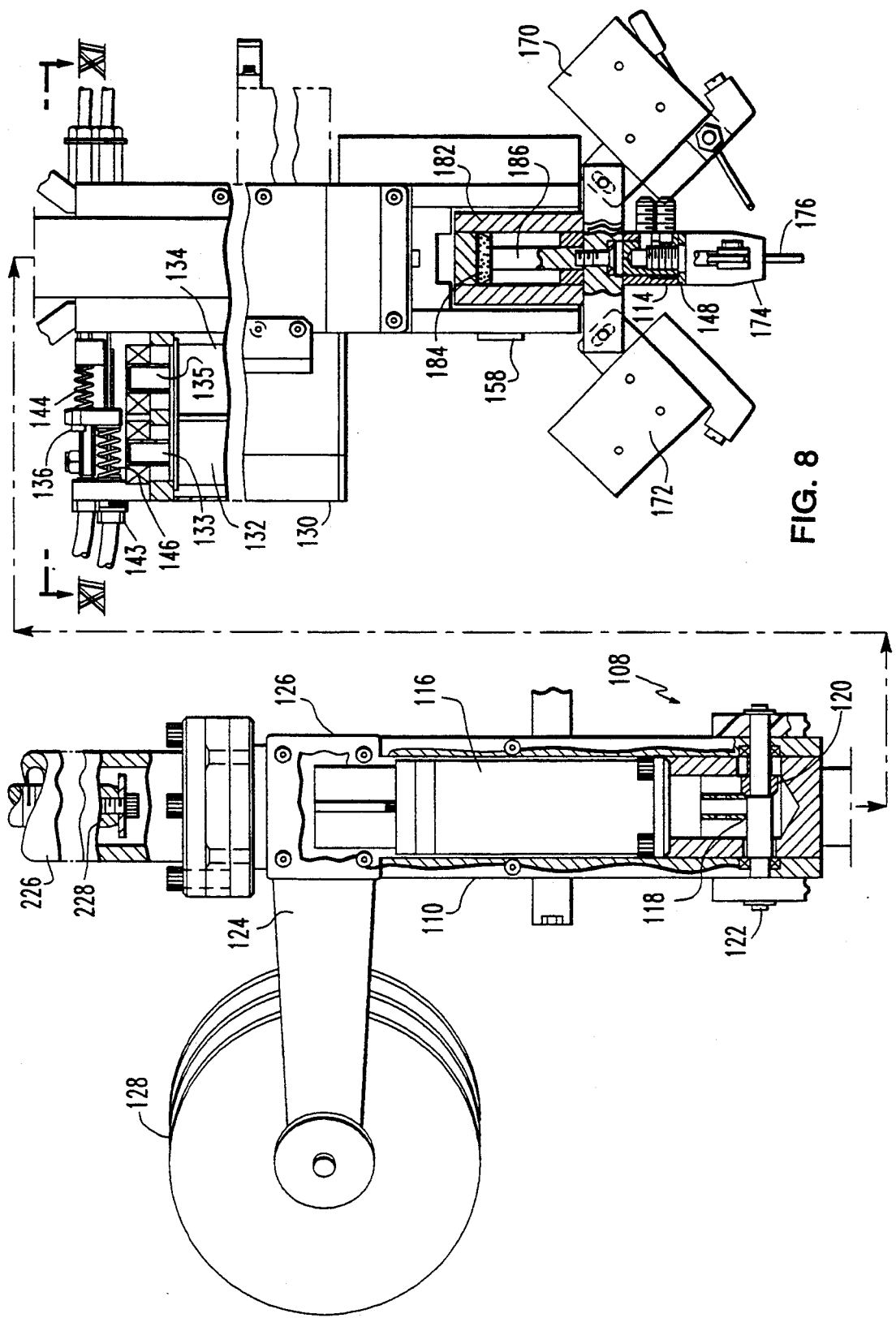
FIG. 8 is a partial section elevational view of the robotic weld arm in accordance with a preferred embodiment of the present invention.
Figure 9:
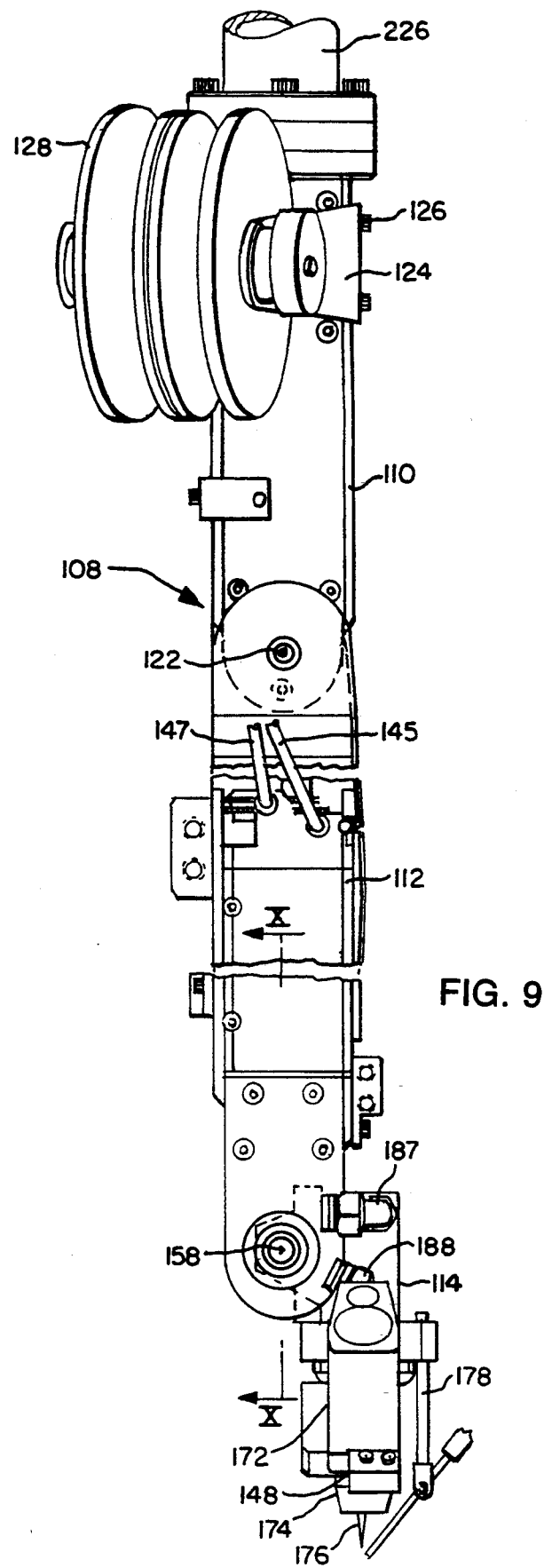
FIG. 9 is a side view of the robotic weld arm illustrated in FIG. 8.
Figure 12:
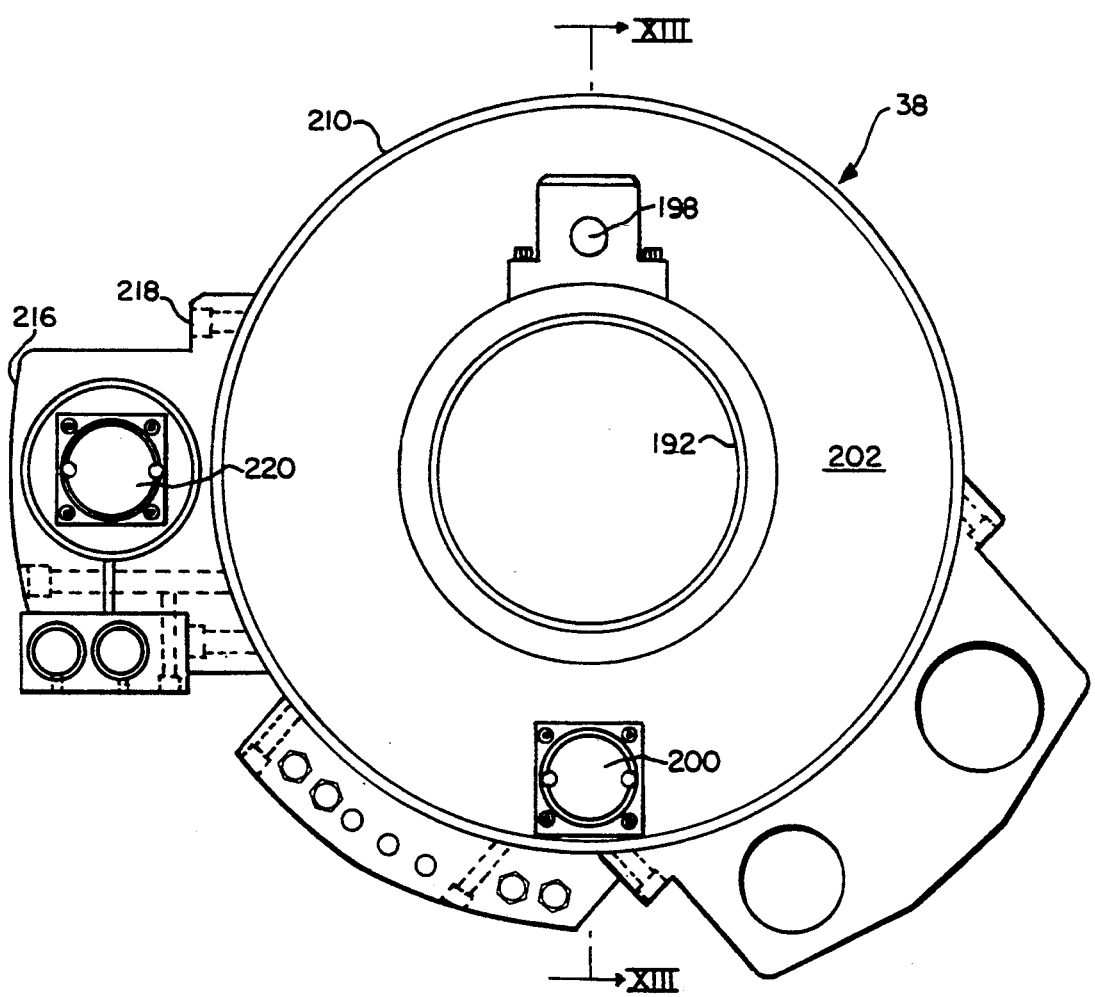
FIG. 12 is a top view of the carousel in accordance with a preferred embodiment of the present invention.
Figure 13:
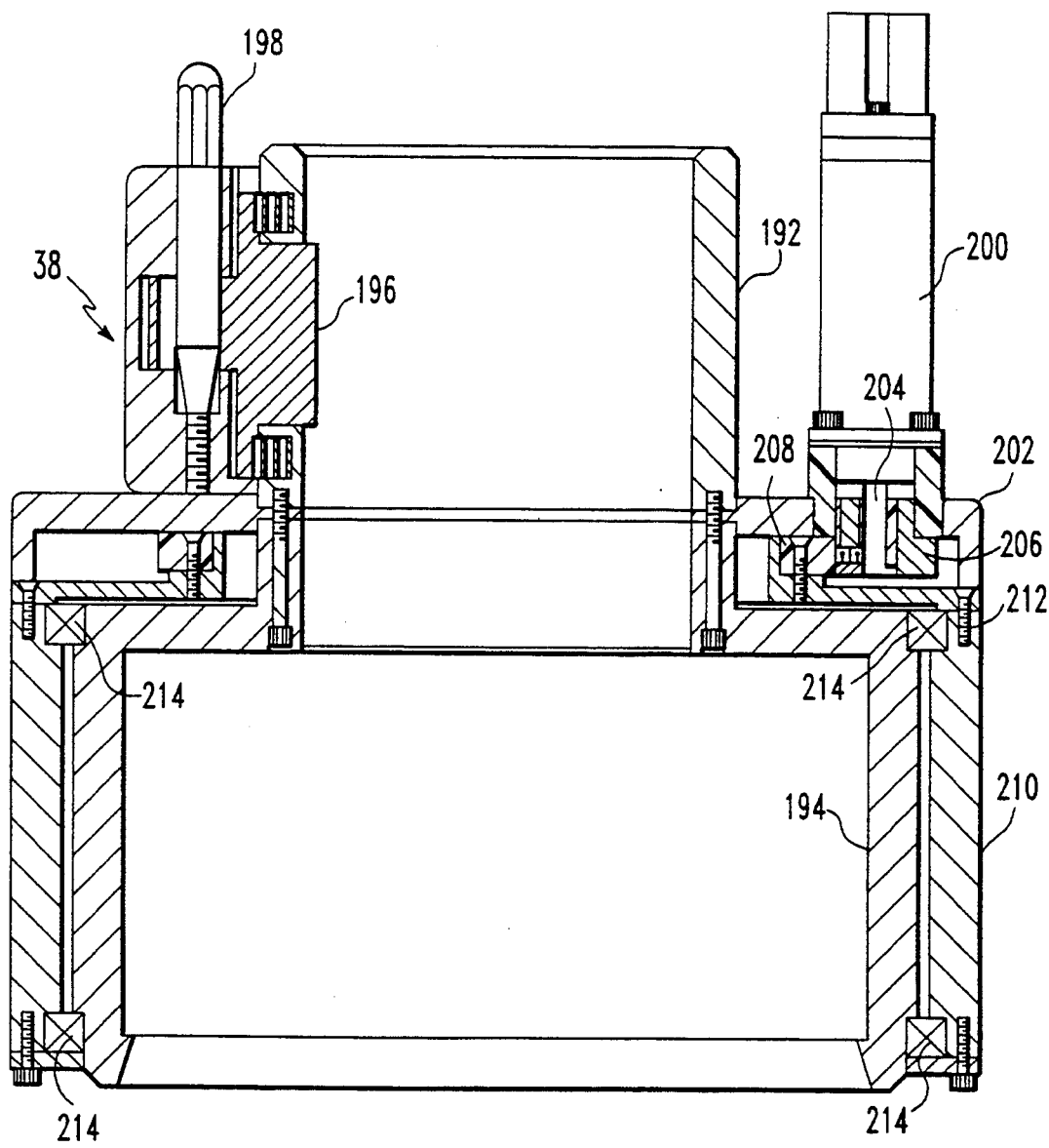
FIG. 13 is a cross-sectional elevational view of the carousel illustrated in FIG. 12 taken along line X—X.
Figure 14:
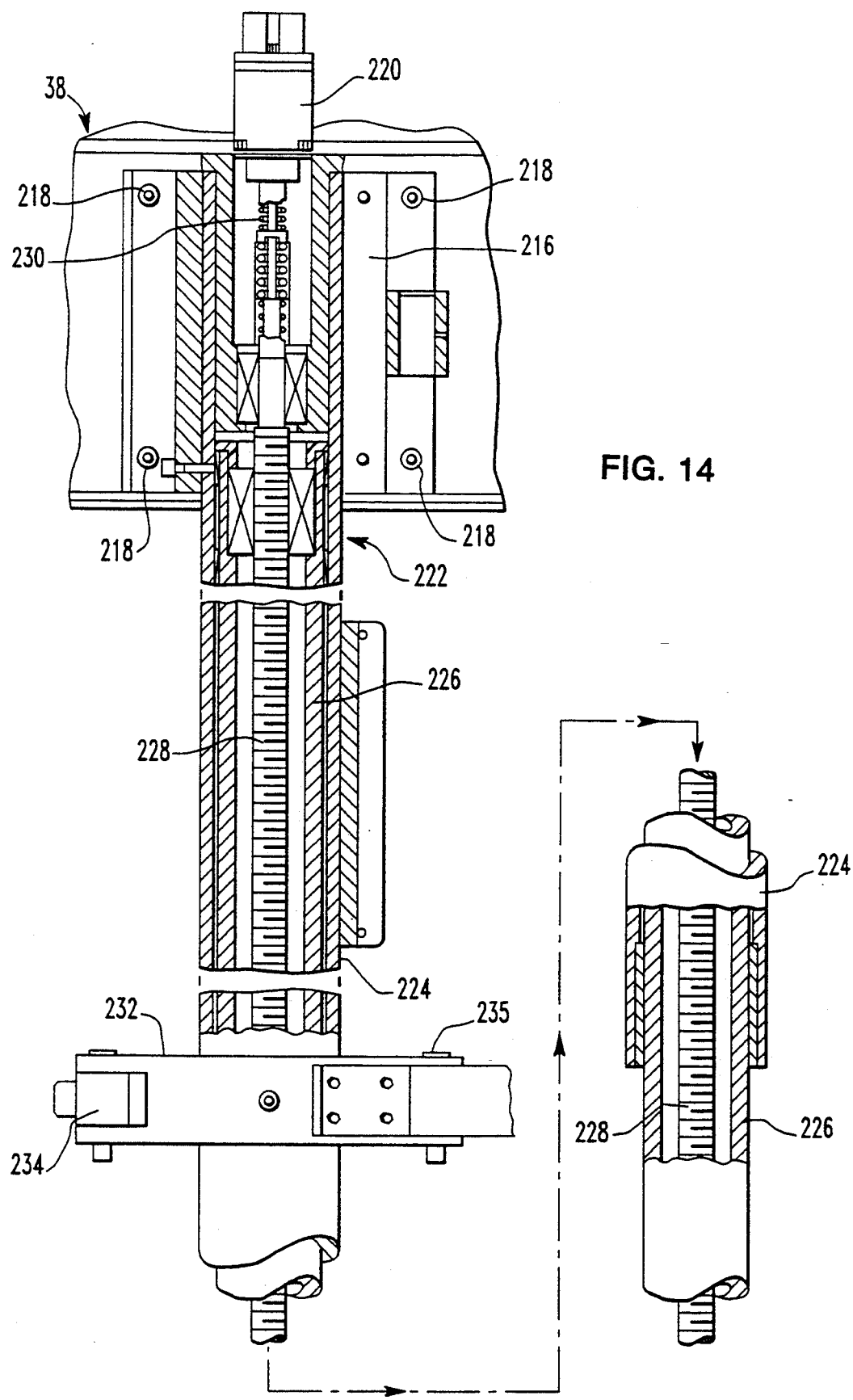
FIG. 14 is a partial sectional view of the carousel illustrated in FIG. 12 taken along line Z—Z.

Generally speaking, the process of welding the canopy seal 32 in place about the omega seal 30 is done remotely by means of a control rod drive canopy seal weld head illustrated in FIGS. 8 and 9 of the drawings. Canopy seal 32 is sealed about the omega seal 30 in order to contain any leakage at the omega seal site. The control rod drive mechanism canopy seal weld system is composed of three individual tools each performing a particular function with the primary goal of being to remotely weld the canopy seal 32 to contain any leakage at the omega seal site. The three component tools are a stalk measuring device 34 shown in FIGS. 3 and 4, a split canopy installation fixture 36 shown in FIGS. 5, 6 and 7 and a robotic weld arm 108 shown in FIGS. 8 and 9. Additionally, a carousel for positioning and maneuvering the stalk measuring device 34 and the robotic weld arm 108 is illustrated in FIGS. 12, 13 and 14. These individual devices are used in conjunction with one another in order to properly position and weld the canopy seal 32 about the omega seal site.

The stalk measuring device 34 is used initially to determine the precise diameter of the adapter tube 28 such that the split canopy installation fixture 36 may properly position the canopy seal 32 about the omega seal site. Once the diameter of the adapter tube 28 is determined, adjustments can be made to the split canopy seal installation fixture 36 so that this fixture will properly engage the adapter tube 28 in order to hold the canopy seal in its proper position for welding. The stalk measuring device 34 is anchored to the carousel 38 by any conventional means; however, because the stalk measuring device 34 is only temporarily mounted to the carousel 38 it is preferred that a mating dovetail structure 40 be utilized. Mounted to the dovetail structure 40 is an extension beam 42 to which an air cylinder 44 is pivotally secured. The air cylinder 44 is pivotally mounted within bracket 46 by way of pivot 48. The extension and retraction of the air cylinder 44 is controlled by compressed air which is fed to, and exhausted from the air cylinder 44 through tube fittings 50 and 51. Pivotally mounted to the extension beam 42, through pivot shaft 52, is a caliper support structure 54, with the caliper support structure 54 being adapted to be displaced in an angular direction by the air cylinder 44. The air cylinder 44 is further pivotally attached to the caliper support structure through pivot 56, this pivotal action to be described in greater detail hereinafter. The caliper support structure 54 supports an air cylinder 58 which is provided between a pair of caliper arms 60 and 62. A plate 64 is provided to extend from the rearward end of the caliper arm 62 and is contacted by a displacement sensor 66. The output generated by the displacement sensor 66 is forwarded to a control center (not shown) by way of cable 68 whereby any movement of the caliper arm 62 is transmitted to the control center which digitally displays the resultant displacement.

The caliper arms 60 and 62 are initially calibrated to a known predetermined diameter prior the positioning of the stalk measuring device 34 adjacent the control rod drive mechanism 26. The stalk measuring device 34 is then anchored to the carousel 38 and lowered down the housing of the control rod drive mechanism 26 to a position adjacent the adapter tube 28. By actuation of the air cylinder 44, the caliper support structure 54 is pivoted to a position normal to the extension beam 42. In doing so, the caliper arms 60 and 62 will be positioned adjacent diametrically opposed sides of the adapter tube 28. Once the stalk measuring device 34 has reached this position the air cylinder 58 is actuated in order to draw the caliper arms 60 and 62 towards one another. This displacement is sensed by the sensor 66 through contact with the plate 64 with the data being forwarded to the control center which provides a digital read out of the actual diameter of the adapter tube 28. Once this actual diameter of the adapter tube 28 has been determined, the air cylinder 58 reverses the action on the caliper arms 60 and 62 which move away from one another. The air cylinder 44 then retracts in order to return the caliper support structure 54 to its original position. Once this position is reached, the stalk measuring device 34 is disconnected from the carousel 38 and removed. As mentioned previously, this measurement is used to properly adjust the split canopy installation fixture 36 in order to properly position the installation fixture 36 about the adapter tube 28.

Figure 5:
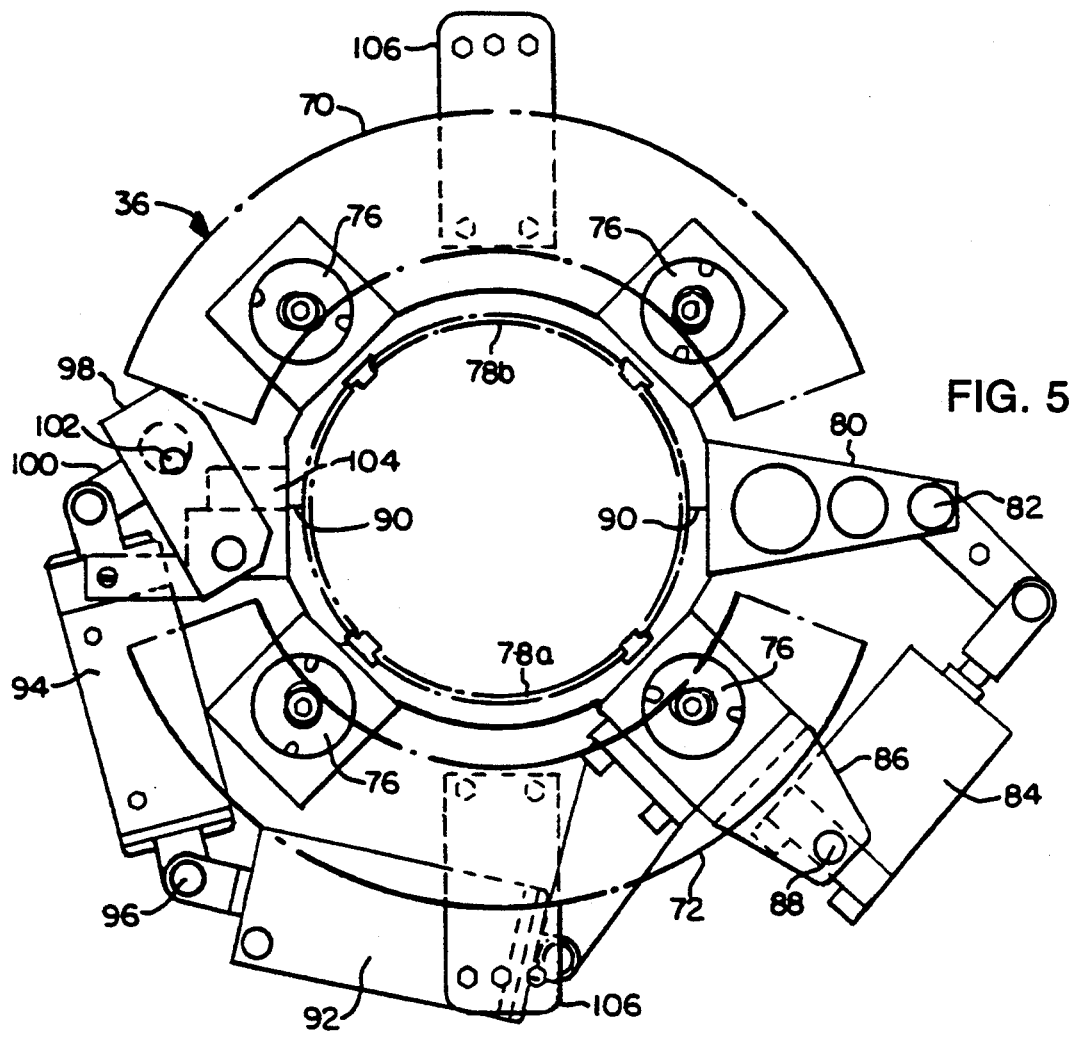
FIG. 5 is an elevational view of the split canopy installation fixture in accordance with a preferred embodiment of the present invention.
Figure 6:
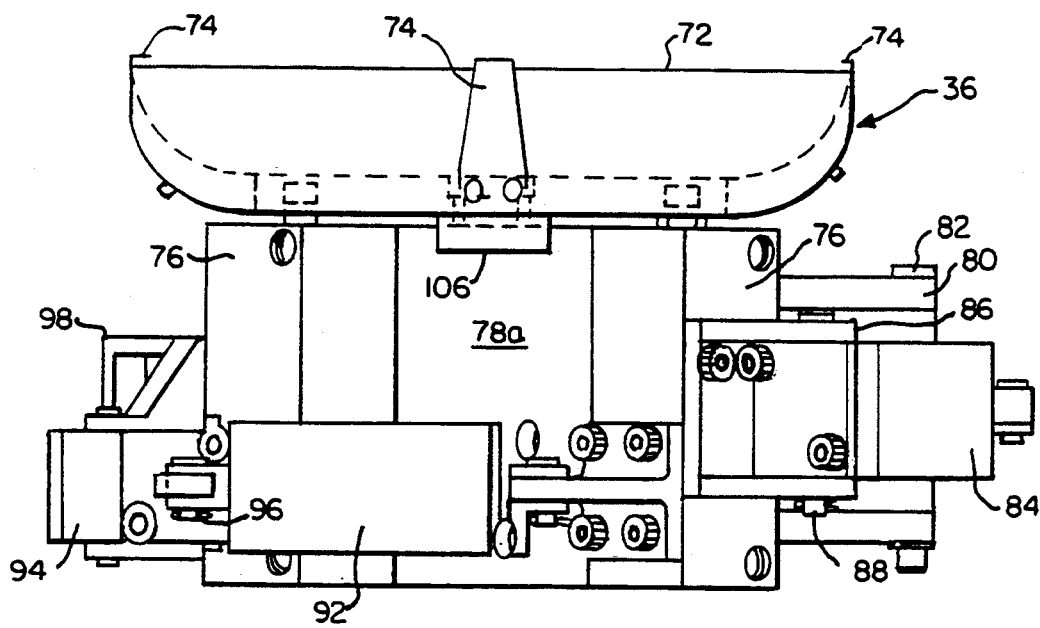
FIG. 6 is partial side view of the split canopy installation fixture of FIG. 5.

Turning now to FIGS. 5, 6 and 7, the split canopy installation fixture 36 will be discussed in greater detail. As can be seen from FIGS. 6 and 7, the split canopy installation fixture 36 includes a pair of semi-circular buckets 70 and 72 for accommodating the two piece canopy seal 32. Each of the buckets 70 and 72 includes a plurality of canopy seal retaining clips 74 which aid in maintaining the canopy seal 32 in position within the buckets 70 and 72 during their positioning. Each of the buckets 70 and 72 are reciprocably mounted on elevating air cylinders 76 for elevating the buckets 70 and 72 for properly positioning the canopy seal beneath the control rod drive mechanism 26. Each of the elevating air cylinders are mounted to the two-piece adapter tube clamp 78a and 78b which are hingedly connected to one another by way of hinge 80. The hinge 80 is pivotable about the pivot pin 82 such that the two-piece adapter tube clamp 78a, 78b may be opened and positioned about the adapter tube 28 and subsequently closed and camlocked tightly to the adapter tube 28. An air cylinder 84 which is pivotally mounted to one of the elevating air cylinders 76 by way of bracket 86 and pin 88 is provided for displacing the hinge 80 in order to open and close the two-piece adapter tube clamp 78a, 78b along the split line 90. An additional dual air cylinder construction is further pivotally mounted to the same elevating air cylinder as that of air cylinder 84. The dual air cylinder consist of a first air cylinder 92 which is pivotally secured to the elevating air cylinder 76 and a second air cylinder 94 which is pivotally mounted at a first end to the first air cylinder 92 by way of pivot pin 96 and is pivotally mounted at a second end to a hinge 98 and a lever arm 100. The hinge 98 includes a camlock 102 which may be forced about the lock lug 104 in order to fixedly clamp the two-piece adapter tube clamp 78a, 78b about the adapter tube 28. In order to maneuver the split canopy installation fixture 36 to a position below control rod drive mechanism 26 and adjacent to the adapter tube 28, lift flanges 106 are provided and secured to a respective one of the buckets 70 and 72. These flanges allow the split canopy installation fixture 36 to be lowered by way of a rope or pole to the desired position.

The purpose of the split canopy installation fixture 36 is to transport the two-piece canopy seal 32 to the omega seal site and properly position the canopy seal 32 about the adapter tube 28. The split canopy installation fixture 36 and the canopy seal 32 are lowered to a position adjacent the adapter tube 28 by using ropes or a pole connected to the lift flanges 106. The two halves of the canopy seal rest in the buckets 70 and 72 as the fixture 36 is lowered. While not shown in the figures, each half of the canopy seal includes locator pins while each of the buckets 70 and 72 include pin holes for accommodating the locator pins of the canopy seal 32 in order to maintain the canopy seal 32 in place during the lowering of the split canopy installation fixture 32.

Once in a position adjacent the adapter tube 28, air cylinder 84 is activated so as to close the two-piece adapter tube clamp 78a and 78b about the adapter tube 28. Once the two-piece adapter tube clamp has been closed around the adapter tube 28, the first air cylinder 92 is activated in order to pivot the hinge 98 to an initial position about the lock lug 104. After this position is reached, the second air cylinder 94 is actuated in order to further push the camlock 102 over a lock lug 104 and firmly secure the adapter tube clamp 78a, 78b to the adapter tube 28. Upon completion of the clamping process, the elevating air cylinders 76 are actuated in unison so as to elevate the canopy seal 32 to the proper position below the control rod drive mechanism 26. The canopy seal 32 is then held in place while the robotic weld arm 108, to be discussed in greater detail below, descends and temporarily tacks the seal in this position.

Once the canopy seal 32 has been properly tacked, the buckets 70 and 72 of the installation fixture 36 are lowered and the camlock 102 is released so that the installation fixture 36 may be removed. Removal of the installation fixture 36 facilitates the robotic weld arm's access to all necessary weld areas of the canopy seal 32.

The robotic weld arm 108 is illustrated in detail in FIGS. 8 and 9. The robotic weld arm 108 includes an upper housing 110, an intermediate housing 112 and a lower housing 114. The upper housing 110 accommodates a first magnetic induction motor 116 which when actuated rotates gear 118 which is meshed with gear 120 which is capable of rotating the intermediate housing 112 about an elbow axis 122 in a desired direction. The upper housing 110 further accommodates the weld wire spool mount bracket 124 which is secured to the upper housing 110 by bolts 126. The spool mount bracket 124 carries a pair of weld wire spools 128 with the wire from a first spool being used for the vertical C-shaped welds between the two-piece canopy seal structure and the weld wire of a second spool being used to perform the upper and lower radial welds about the canopy seal 32.

Figure 11:
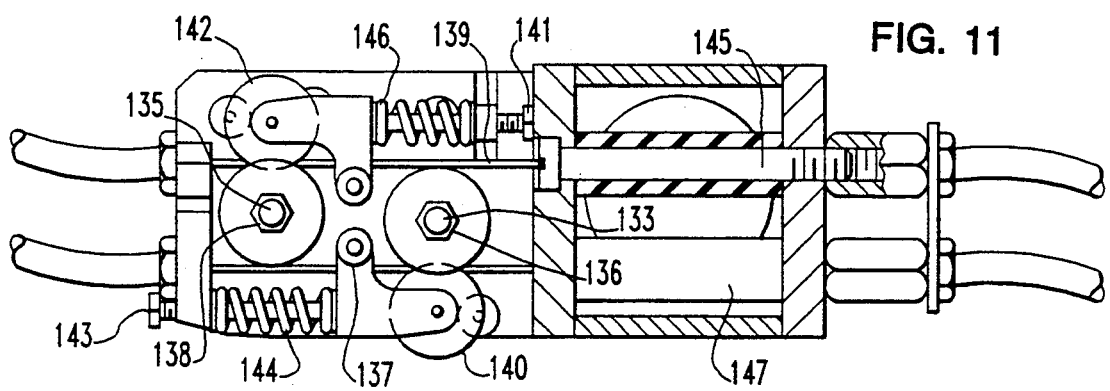
FIG. 11 is a partial cross-sectional view of the weld wire feed mechanism taken along line S—S of FIG. 8.

A weld wire drive mechanism 130 is secured to the intermediate housing 112. The weld wire drive mechanism 130 includes a pair of wire feed drive motors 132 and 134 which rotate the drive shafts 133 and 135 respectively. As shown in FIG. 11, each of the drive shafts 133 and 135 drive respective wire feed drive rollers 136 and 138 which drive the weld wires 137 and 139. Counter wire feed rollers 140 and 142 are provided for pressing the respective weld wire against the drive rollers. The force in which the counter rollers 140 and 142 contact the weld wire may be readily adjusted by the tension adjustment screws 141 and 143. Springs 144 and 146 assure the continuous contact between the counter rollers 140 and 142 and the respective weld wire. As can be further noted from FIG. 11, wire feed guide tubes 145 and 147 are provided in order to guide the weld wire through the weld wire drive mechanism 130 to the weld head 148.

Figure 10:
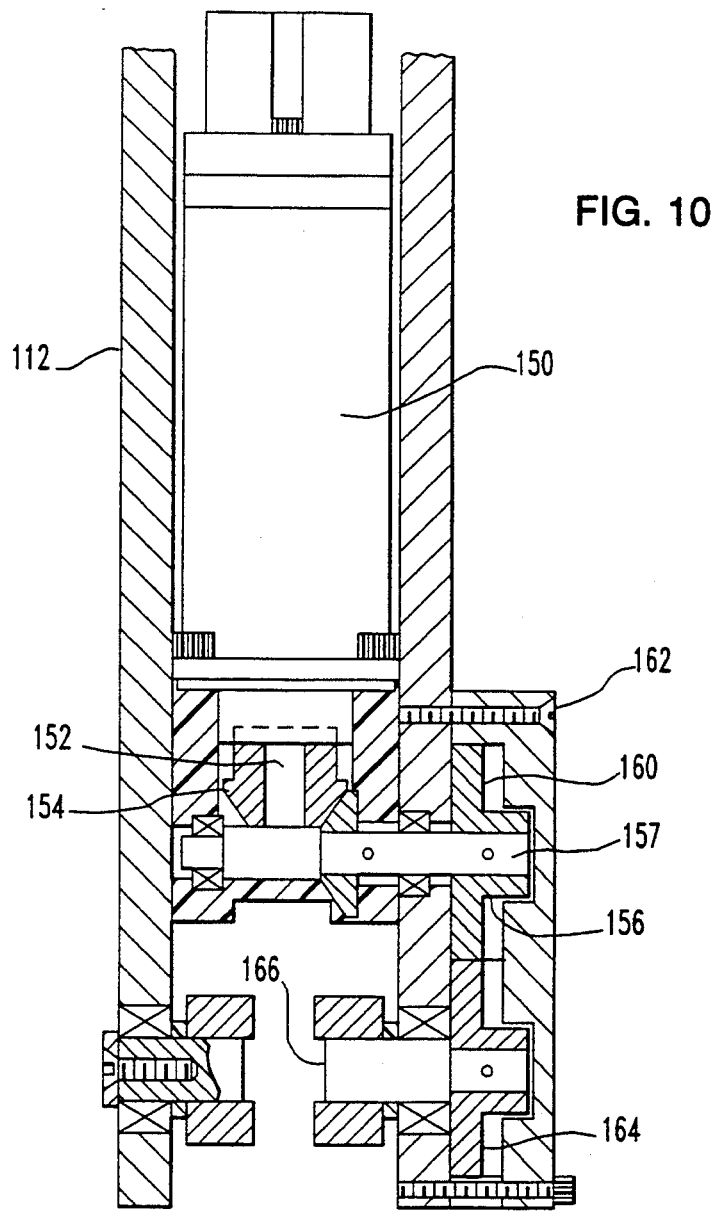
FIG. 10 is a cross-sectional view of the drive mechanism for the wrist joint of the robotic weld arm taken along line W—W of FIG. 9.

Intermediate housing 112 further accommodates a second magnetic induction motor 150 as shown in FIG. 10. The second magnetic inductor motor 150 includes a drive shaft 152 which drives gear 154 which mates with gear 156 which rotates the shaft 158 and subsequently the gear 160 mounted within the gear housing 162. Gear 160 is meshed with a cooperating gear 164 within the gear housing 162 which rotates the shaft 166 within the bearings 168 which ultimately pivots the lower housing 114 about a wrist axis which is constituted by the shaft 166.

Cameras 170 and 172 are provided for inspecting both the leading and trailing edges of the weld as it is being formed by the weld head 148. The weld head 148 includes a gas torch 174 and a tungsten weld wire wire 176. An additional weld wire guide 178 is provided at a position near the end portion of the weld head 148 so as to appropriately guide the weld wire to a position adjacent the weld head 148. The cameras 170 and 172 are additionally provided with lens covers 180 for protecting the cameras during the welding process.

The robotic weld arm 108 is provided with five degrees of freedom, one being the rotation about the wrist axis, the second being the rotation about the elbow axis 122. A third degree of movement is the vertical movement of the weld head 148 which is performed by piston cylinder assembly 182 which is accommodated in the lower housing 114. The piston cylinder assembly 182 is composed of a piston 184 having a shaft 186 secured to the weld head 148. Hydraulic fluid is provided to the piston cylinder assembly through the hydraulic fittings 187 and 188. By varying the flow of fluid through the hydraulic fittings 187 and 188, the vertical positioning of the weld head may be varied. This feature will be discussed in greater detail hereinafter.

Two additional degrees of freedom are provided to the robotic weld arm 108 by way of the carousel 38 shown in FIGS. 12–14. The carousel 38 is adapted to be positioned about an upper portion of the control rod drive mechanism 26. As shown in FIG. 13 the carousel 38 includes a chuck housing 192 and an inner housing 194 with the chuck housing including a reciprocable resilient pad 196 which may be readily displaced by the pin 198. Once the carousel 38 is positioned about the control rod drive mechanism 26, the pin 198 is driven forwardly so as to displace and press the resilient pad 196 against an upper portion of the control rod drive mechanism 26. This will maintain the carousel in a stable position relative to the control rod drive mechanism 26. A magnetic induction motor 200 is supported on a top hat plate 202 above the inner housing 194. The magnetic induction motor 200 includes a drive shaft 204 having a gear 206 fixedly secured thereto. The gear 206 is meshed with a ring gear 208 which is secured to an outer housing 210 by way of a flange 212. The outer housing 210 is permitted to rotate about the inner housing 194 by way of bearings 214.

As can be seen from FIGS. 12 and 14, a mount 216 is fixedly secured to an outer portion of the outer housing 210 which supports the robotic weld arm 108 as well as a mechanism for vertically displacing the robotic weld arm. As shown in FIG. 14, the mount 216 is secured to the outer housing 210 by way of bolts 218, and accommodates a magnetic induction motor 220. A telescopic tubular construction 222 is suspended from the mount 216 and includes an outer tubular member 224 and an inner displaceable tubular member 226. As noted in FIG. 8, this inner tubular member 226 is also attached to the robotic weld arm and surrounds the screw shaft 228. The screw shaft 228 is connected to the output drive shaft 230 of the magnetic induction motor 220. Rotation of the output drive shaft 230 and consequently the rotation of the screw shaft 228 causes of the displacement of the inner tubular member 226 relative to the outer tubular member 224 which subsequently results in the vertical displacement of robotic weld arm 108. Additionally, mounted to an outer portion of the outer tubular member 224 is a spacer which includes rollers 234 and 235 which contact an outer portion of the control rod drive mechanism 26 so as to aid in the stabilization of the robotic weld arm 108.

As can be seen from the foregoing, it is the carousel 190 in conjunction with the robotic weld arm 108 which provides the necessary five degrees of freedom such that the robotic weld arm 108 can perform both the upper and lower radial welds as well as the C-shape vertical welds in a narrowly confined space.

The motion of the robotic weld arm is controlled by a central computer system which has been programmed with preset data for controlling the positioning of the robotic weld arm 108 as well as the speed of the welding process. The welding process is controlled by an ARC machine (not shown) the ARC machine provides the necessary power to the robotic arm for performing the welding process. The central computer which controls the positioning of the robotic weld arm also controls the positioning of the torch and the speed of the torch movement. As noted previously, the weld head 148 may be manipulated in a direction parallel to the direction in which the weld head 148 is positioned by the wrist axis by way of the piston cylinder assembly 182. This allows for an instantaneous movement of the tungsten weld wire 176 so as to maintain a constant ARC between the tungsten weld wire 176 and the surface being welded.

The entire welding process is carried in the following manner. Initially, the carousel 38 is positioned about the control rod drive mechanism 26 and secured thereto by the resilient pad 196. Once in this position, the stalk measuring device 34 can be secured thereto and suspended adjacent the control rod drive mechanism 26 and the adapter tube 28. Upon actuation of the air cylinder 44, the caliper support structure will pivot and position the caliper arms 60 and 62 on diametrically opposite sides of the adapter tube 28. Air cylinder 58 is then actuated to displace the caliper arms 60 and 62 towards one another with this displacement being sensed by the displacement sensor 66. The displacement sensed by the sensor 66 is transmitted by way of the cable 68 to a control center where the actual diameter of the adapter tube 28 is provided. Once the actual diameter of the adapter tube 28 has been determined, the stalk measuring device 34 is removed from its position adjacent control rod drive mechanism 26.

The split canopy installation fixture 36 is then adjusted such that it may be securely fixed to the adapter tube 28. The two-piece canopy seal is next positioned within the buckets 70 and 72 of the split canopy installation fixture 36 with this fixture then being lowered to a position adjacent the adapter tube 28. Next, the hydraulic air cylinder 84 is activated such that the hinge 80 is displaced to open the two-piece adapter tube clamp 78a, 78b. The split canopy installation fixture is then positioned about the adapter tube 28 with the air cylinder 84 then being actuated in a reverse manner to close the two-piece adapter tube clamp 78a, 78b about the adapter tube 28. Once the installation fixture 36 is closed around the adapter tube, it is camlocked in place by the cooperating movement of the first and second air cylinders 92 and 94 which positions the camlock 102 about the lock lug 104. After the fixture has been secured about the adapter tube 28, the elevating air cylinders 76 are actuated so as raise the buckets 70 and 72 to properly position the canopy seal 32 as shown in FIG. 2. The canopy seal is held in place by the split canopy installation fixture 36 while the robotic weld arm 108 descends to a position adjacent the seal and temporarily tacks the canopy seal in place. When the canopy seal 32 has been properly tacked in place, the buckets 70 and 72 of the installation fixture 36 are retracked, the camlock is released and the fixture is removed. Removal of the split canopy installation fixture 36 facilitates the robotic weld arm's access to all necessary weld areas of the canopy seal 32. The robotic weld arm 108 with its previously mentioned five degrees of freedom is capable of following the C-shaped vertical welds between the two-piece canopy seal as well as the upper and lower radial welds in the confined space between adjacent control rod drive mechanisms 26.

After the split canopy installation fixture 36 has been removed, an argon gas purge is inserted in the canopy seal 28 to a evacuate any oxygen at the omega seal site. The preset data contained in the control center directs the robotic weld arm 108 to complete an initial tacking of the seal in place. The robotic weld arm 108 then begins the vertical C-shape welds and subsequently completes the top and bottom radial welds except for a vent opening which is provided for the purge gas insertion. The purge gas insertion is then removed and the robotic weld arm applies a final hot pass weld which closes the argon gas purge vent opening. As stated previously, the welding process is controlled by an ARC machine which provides the necessary power to the robotic weld arm 108 for welding. During the welding process data is continuously presented to the control center which is used to manipulate the robotic weld arm 108 and particularly the tungsten weld wire 176.

I claim:

1. A device for accurately positioning a canopy seal about a ruptured seal site between telescoping tubular members comprising;

a pair of semi-circular clamp members hingedly connected to one another at a first mating end thereof; and a canopy seal transporting means positioned above each of said semi-circular clamp members for holding said canopy seal;

wherein said semi-circular clamp members are clamped about one of said tubular members to position said canopy seal about said ruptured seal site between said telescoping tubular members.

2. The device as defined in claim 1, further comprising means for pivoting said semi-circular clamp members about said hinge connection.

3. The device as defined in claim 2, where said semi-circular clamp members are each half-circle members.

4. The device as defined in claim 3, further comprising a latch means pivotally connected to a second end of one of said semi-circular clamp members; and a latch receiving means connect to a second end of the other of said semi-circular members; wherein said latch and said latch receiving means cooperate to forcedly clamp said clamp members about one of said telescoping tubular members.

5. The device as defined in claim 4, further comprising means for selectively latching said latching means about said latch receiving means.

6. The device as defined in claim 4, wherein said latch means is a camlock and said latch receiving means is a lock lug.

7. The device as defined in claim 1, further comprising elevating means for elevating said transporting means to accurately position said canopy seal held in said transporting means about said ruptured seal site.

8. The device as defined in claim 1, wherein said transporting means includes a pair of bucket members which conform to the shape of said canopy seal and each of said buckets cooperates with one of said semi-circular clamp members.

9. A device for accurately positioning a canopy seal about a ruptured seal site between a control rod drive mechanism and an adapter tube comprising;

a pair of semi-circular clamp members hingedly connected to one another at a first mating end thereof by a hinge means;

means for pivoting said semi-circular clamp members about said hinge means;

a latch means pivotally connected to a second end of one of said semi-circular clamp members;

a cooperating latch receiving means connected to a second end of the other of said semi-circular clamp members;

means for selectively latching said latch means about said latch receiving means;
a canopy seal transporting means positioned above each of said semi-circular clamp members; and
elevating means for elevating said transporting means;
wherein said semi-circular clamp members are clamped about said adapter tube and said elevating means positions said canopy seal about said ruptured seal site between said control rod drive mechanism and said adapter tube.

10. The device as defined in claim 9, wherein said transporting means includes a pair of bucket members which conform to the shape of said canopy seal and each of said buckets cooperates with one of said semi-circular clamp members.

11. The device as defined in claim 9, wherein said latch means is a camlock and said latch receiving means is a lock lug.

12. In a system for remotely welding a canopy seal about a ruptured seal site between telescoping tubular members, a robotic weld arm comprising;
an elongated housing having an upper portion, an intermediate portion and a lower portion; and
a welding means accommodated by said lower portion for welding said canopy seal about said ruptured seal site.

13. The robotic weld arm as defined in claim 12, wherein a first end of said intermediate portion of said housing is pivotably connected to a lower end of said upper portion with respect to said lower portion.

14. The robotic weld arm as defined in claim 12, wherein a second end of said intermediate portion of said housing is pivotably connected to an upper end of said lower portion of said housing with respect to said upper portion.

15. The robotic weld arm as defined in claim 12, further comprising a weld wire feed means for feeding weld wire to said welding means during the welding process.

16. The robotic weld arm as defined in claim 15, wherein said weld wire feed means further comprises a driven feed roller for feeding said weld wire, and a cooperating counter roller for maintaining said weld wire in contact with said weld wire feed roller.

17. The robotic weld arm as defined in claim 16, wherein said drive roller is driven by a magnetic induction motor.

18. The robotic weld arm as defined in claim 15, wherein said weld wire feed means is a dual weld wire feed means for selectively feeding either one of two weld wires to said welding means.

19. The robotic weld arm as defined in claim 13, further comprising a first pivoting means for pivoting said intermediate portion of said housing relative to said upper portion.

20. The robotic weld arm as defined in claim 19, wherein said first pivoting means includes a drive means for selectively rotating a drive shaft, a first gear concentrically mounted in a fixed position on said drive shaft, and a second gear fixedly mounted with respect to said intermediate portion and meshed with said first gear, so that rotation of said drive means pivots said intermediate portion with respect to said upper portion.

21. The robotic weld arm as defined in claim 14, further comprising a second pivoting means for pivoting said lower portion relative to said intermediate portion.

22. The robotic weld arm as defined in claim 21, wherein said second pivoting means includes a drive means for selectively rotating a drive shaft, a first gear concentrically mounted in a fixed position on said drive shaft, a second gear meshed with said first gear and fixed to a first concentric transfer shaft for transferring rotational movement to a third gear concentrically mounted on said first transfer shaft, and a fourth gear meshed with said third gear and concentrically mounted on a second transfer shaft, so that said lower portion of said housing is fixed to said second transfer shaft and rotation of said drive shaft is transferred into pivotal movement of said lower portion.

23. The robotic weld arm as defined in claim 12, further comprising translational movement means for imparting translational movement to said welding means relative to said lower portion.

24. The robotic weld arm as defined in claim 23, wherein said translational movement means includes a piston cylinder assembly having a displaceable shaft connected to said welding means for selectively moving said welding means toward and away from a welding surface.

25. The robotic weld arm as defined in claim 12, further comprising at least one camera for viewing the weld during the welding process.

26. The robotic weld arm as defined in claim 25, wherein two cameras are provided with a first camera viewing a leading edge of said weld and a second camera for viewing a trailing edge of said weld.

27. The robotic weld arm as defined in claim 12, wherein said welding means is controlled by an ARC machine.

28. The robotic weld arm as defined in claim 12, further comprising a telescopic positioning means connected to an upper end of said upper portion for extending and retracting said robotic weld arm in a direction of said upper portion.

29. The robotic weld arm as defined in claim 28, wherein said telescopic positioning means includes an outer tubular section, an inner tubular section, a screw shaft extending in a longitudinal direction of said telescopic positioning means within said tubular sections, means for rotating said screw shaft, and a translational means fixedly mounted within said inner tubular section and cooperating with said screw shaft such that rotation of said screw shaft extends and retracts said inner tubular section relative to said outer tubular housing thereby extending and retracting said robotic weld arm.

30. The robotic weld arm as defined in claim 29, further comprising an orbital motion means having an inner portion fixedly secured to one of said tubular members and an outer portion rotatably positioned about said inner portion, wherein said means for rotating said screw shaft and said outer tubular section are fixedly secured to said orbital motion means, and rotation of said outer portion of said orbital motion means transmits orbital rotation to said robotic weld arm about said tubular members.

31. The robotic weld arm as defined in claim 12, wherein said welding means and motion of said robotic weld arm are controlled by a preprogrammed control means.

32. A seal for containing radioactive steam emitted from an omega seal between a control rod drive mechanism and an associated adapter tube comprising:
a first semi-circular seal section;
a second semi-circular seal section; and securing means for securing said first and second semi-circular seal sections about the omega seal;

wherein said first and second semi-circular seal sections enclose the omega seal for containing any radioactive steam emitted from the omega seal.

33. The seal as defined in claim 32, wherein said first and second semi-circular seal sections are concaved inwardly for receiving the omega seal therein.

34. The seal as defined in claim 33, wherein said securing means is a weld.

35. The seal as defined in claim 34, wherein an upper periphery of said first and second semi-circular seal sections are welded to the control rod drive mechanism and a lower periphery of said first and second semi-circular seal sections are welded to the adapter tube.

36. The seal as defined in claim 35, wherein said first and second semi-circular seal sections are welded to one another at respective adjacent ends thereof.

37. The seal as defined in claim 32, wherein a space enclosed by said first and second semi-circular seal sections is purged with a gas.

38. The seal as defined in claim 37, wherein said gas is argon gas.

39. A canopy seal for containing radioactive steam emitted from an omega seal between a control rod drive mechanism and an associated adapter tube comprising:

a substantially circular sealing member, said sealing member being concaved inwardly for enclosing the omega seal;

a first securing means for securing an upper periphery of said sealing member to an outer surface of the control rod drive mechanism; and a second securing means for securing a lower periphery of said sealing member to an outer surface of the adapter tube;

wherein said sealing member encloses the omega seal for containing any radioactive steam emitted from the omega seal.

40. The canopy seal as defined in claim 39, wherein said first and second securing means are welds.

41. The canopy seal as defined in claim 39, wherein a space enclosed by said sealing member is purged with a gas.

42. The seal as defined in claim 41, wherein said gas is argon gas.

* * * * *